United States Patent

[11] 3,603,998

| [72] | Inventor | Philip Kassel<br>8 Woodridge Lane, Seacliff, N.Y. 11579 |
|---|---|---|
| [21] | Appl. No. | 9,464 |
| [22] | Filed | Oct. 1, 1969 |
| [45] | Patented | Sept. 7, 1971 |

[54] RADAR SYSTEM
7 Claims, 8 Drawing Figs.

| [52] | U.S. Cl. | 343/12 R, 343/13 |
|---|---|---|
| [51] | Int. Cl. | G01s 9/04 |
| [50] | Field of Search | 343/7 TA, 12, 12 A, 12 SB, 13 |

[56] References Cited
UNITED STATES PATENTS

| 2,676,317 | 4/1954 | Purington | 343/13 |
|---|---|---|---|
| 3,090,951 | 5/1963 | Mieher | 343/12 X |
| 3,201,789 | 8/1965 | Fine | 343/125 B |
| 3,277,467 | 10/1966 | Barney | 343/7 TA |

*Primary Examiner*—Malcolm F. Huber
*Attorneys*—Richard S. Sciascia, John W. Pease and Harvey A. David

THIS APPLICATION FILED UNDER RULE 47

ABSTRACT: A height finding radar clutter and range improvement system is described having means for switching between a lowered beam pattern for transmission and a higher beam pattern for reception, thereby improving the signal to clutter ratio for near range and improving long range low altitude detection. The system includes means for effecting the switching as a function of time and range.

Philip Kassel
INVENTOR.

BY Harvey A. David

Attorneys

Philip Kassel
INVENTOR.
BY Harvey A. David

Attorneys

RADAR SYSTEM

BACKGROUND OF THE INVENTION

This invention relates to clutter and range improvements in radar systems, and more particularly to such improvements suitable for employment, for example, in a three-dimensional type of aircraft detection and height finding radar system utilizing two fan beams, one vertical and one at a slanted angle of 45°, to measure target height. In such a system each beam has been tilted upward from the horizon at angles which provide a compromise between low near-range clutter and good long-range detectability. If the beams were tilted low for optimum long range performance at low elevation angles, heavy ground or sea return clutter has been detected at near ranges, obscuring some targets therein. Conversely, if the beams were tilted high, clutter was minimized but long-range performance at low target angles was sacrificed.

SUMMARY OF THE INVENTION

With the foregoing in mind it is a principal object of the invention to provide an improved radar system and method which are characterized by a notable reduction in sea or ground return, near-range clutter together with improved sensitivity for detecting targets at relatively low altitudes and long ranges.

As another object this invention aims to accomplish the foregoing through the use of means for electronically elevating the beams by a predetermined amount during the receiving period, or a portion thereof, the beams being held at a normal or lower elevation during the pulse transmission period. The invention contemplates the movement of the beams between the high beam and low beam positions by electronic switching means which alternatively renders active first and second dipole elements or horns associated with the beam forming portion of the antenna.

DESCRIPTION OF THE DRAWINGS

The invention may be further summarized as residing in certain combinations and arrangements of parts by which the foregoing objects and advantages are achieved as well as others which will become apparent from the following description of a preferred embodiment when read in conjunction with the accompanying sheets of drawings forming a part of this specification, and in which.

DESCRIPTION OF THE PREFERRED EMBODIMENT

Figure 1:
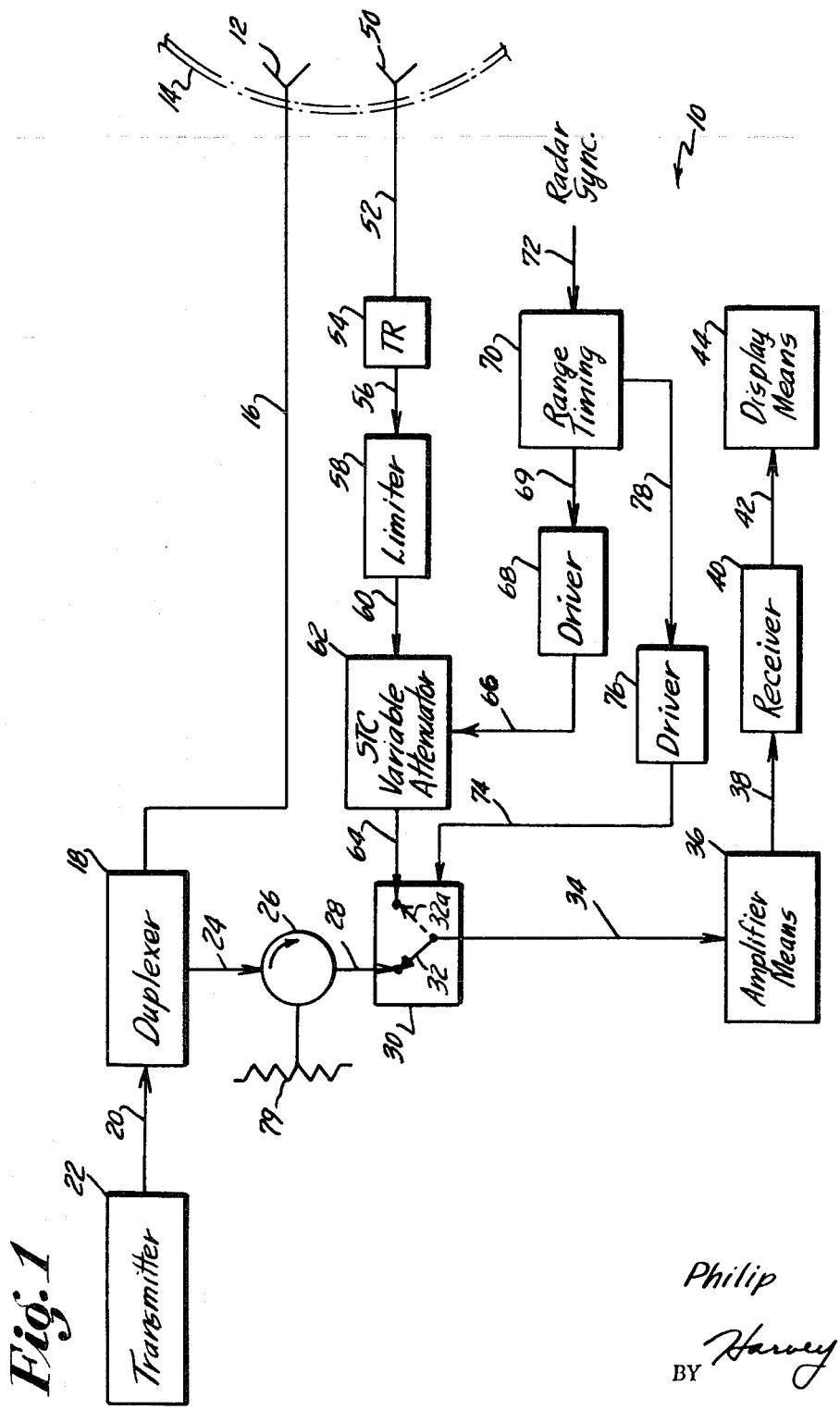
FIG. 1 is a diagrammatic illustration, in block form, of a radar system embodying the invention.

The invention will be described hereinafter with reference to the main or vertical fan beam, although it will be understood that the same principles may be applied in general to the slant fan beam. In the form of the invention illustrated in FIG. 1 and now to be described, there is a radar system generally indicated at 10 comprising an antenna feed in the form of a dipole 12 associated with a beam forming antenna or dish 14. The dipole 12 is connected by suitable conductor means, as shown by flow line 16, to a duplexer 18 which is connected to via line 20 to a transmitter 22. The duplexer 18 is also connected by line 24, a circulator 26, and a line 28, to the input side of a microwave switch 30.

The microwave switch 30 is shown functionally in FIG. 1 as providing a microwave path 32 normally connecting the input from line 28 to an output line 34. The line 34 is connected to the input of amplifier means 36 which processes incoming radar signals for application via line 38 to the receiver portion 40 of the radar system 10. The receiver 40 converts the received, amplified, and processed signals to suitable video signals which are supplied as shown by line 42 to the customary display means 44.

In this example the invention is implemented by the provision of an auxiliary dipole 50 positioned at the antenna 14 to receive signals from a vertical-beam pattern which has a higher elevation angle than the main beam which is propagated by the dipole 12.

The dipole 50 is connected by suitable microwave conductor means represented by line 52, a conventional TR box 54, and a line 56 to a limiter 58 which prevents the high energy of the transmitter pulse from overloading and burning out the units which follow it.

The limiter 58 is connected to pass incoming signals via line 60 to an S.T.C. (sensitivity time control) variable attenuator 62, which, in turn, passes processed signals via line 64 to the microwave switch 30. The S.T.C. attenuator 62 is included in the line between the high beam horn or dipole 50 and the switch 30 to normalize the near-range targets and remaining clutter. This processing comprises attenuation of the signals as a function of time, the variation of the attenuation being effected in response to an input via line 66 from a driver 68 which is controlled via line 69 by range timing means 70. The range timing means 70 receives radar synch signals as a reference input as shown by line 72.

Figure 2:
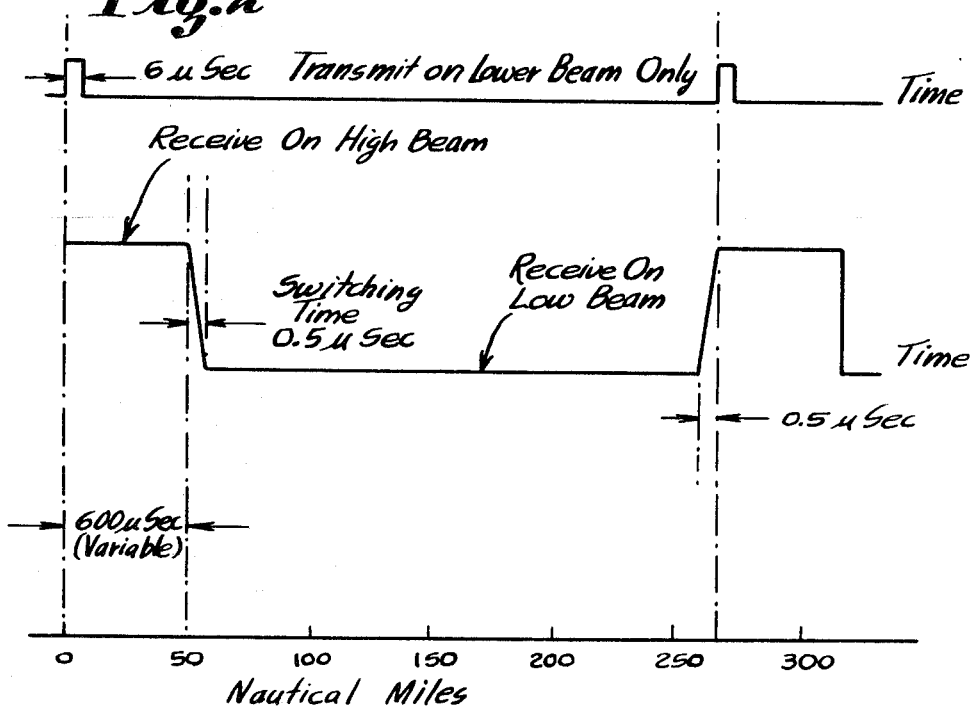
FIG. 2 is a graphical representation of the beam switching sequence employed by the system of FIG. 1.

For long range operation, and with the microwave switch in its normal condition for conduction via path 32, the radar system 10 is operated by transmitting and receiving only on the lower beam (upper dipole 12), near-range clutter not being a particular problem. At some midrange, for example 50 miles when going from long-range to near-range operation, the receiver is switched by switch 30 to receive input not from the lower beam (upper dipole 12), but rather from the upper beam (lower dipole 50). This is effected by a switching order via line 74 to the switch 30 from a driver 76 which is controlled via line 78 by the range timing means 70. The dotted line position 32a of the microwave path in the switch 30 illustrates the condition thereof when receiving from the elevated or upper beam. In this condition, energy received by the dipole 12 is passed by the circulator 26 to an attenuator 79. The switching time of suitable microwave switches can be as small as 0.1 $\mu$sec. but in the example illustrated in FIG. 2 is on the order of 0.5 $\mu$sec. A beam switching time equal to about a tenth of the transmission pulse width minimizes both the data lost in the switch interval and system transients.

The present invention permits lowering of the vertical beam from a normal elevation of 2.65°, for example, to 1.5°. This results in a marked improvement in long-range detectability of distant targets. This lowered beam constitutes the aforedescribed low beam which is used for transmission for both long-range and near-range operation, but which is used for receiving only for ranges beyond a predetermined midrange such as the mentioned 50 mile switching point. For ranges within the 50 mile, or other selected switching point, the high beam pattern is utilized for receiving.

The minimum angle of separation of the low and high beams is limited somewhat by the particular physical sizes of the antenna feed means such as dipoles, horns or the like. The maximum separation is limited by beam deterioration. A study of antenna patterns for a particular radar led to a choice in this example of a beam separation of 4.5°. Thus, with a low beam of 1.5°, the high beam was selected to be 6°. It will be understood, of course, that different radar systems having different radar patterns would perhaps vary in the optimum separation of the high and low beams. Moreover, while the principles involved are applicable to the slant beam portions of radar systems having such, it will be understood that the separation of high and low beams, as well as the minimum angle of elevation of the low beam will be best determined on an individual basis from consideration of the respective beam patterns, the the like.

One measure of results of the invention may be considered to be the signal-to-clutter improvement ratio Psc in the near-range operation, which ratio is derived in the following manner.

Figure 3:
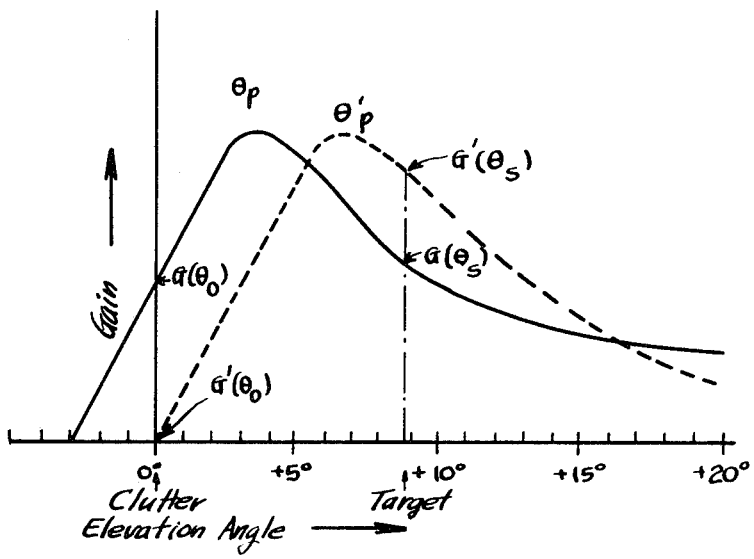
FIG. 3 is a graphical representation of antenna elevation patterns.

The clutter reduction in the near-range interval is the difference in antenna gain at zero elevation. See FIG. 3. Thus, the clutter reduction ratio is:

$Pc = G'(\theta_o)/G(\theta_o)$    (Eq. 1.)

where:

$G'(\theta_o)$ is the gain of the high beam at 0° (in elevation), $G(\theta_o)$ is the gain of the low beam at 0° (in elevation), and Pc is the clutter reduction ratio Similarly, the change in signal level of an airborne target at a higher elevation angle $\theta_s$ is:

$Ps = G'(\theta_s)/G(\theta_s)$    (Eq. 2.)

where:

$G'(\theta_s)$ is the gain of the high beam at target elevation angle $\theta_s$, $G(\theta_s)$ is the gain of the low beam at the target elevation angle $\theta_s$, and Ps is the signal-level improvement ratio The signal-to-clutter improvement ratio *Psc* is the quotient of Ps divided by Pc:

$Psc = Ps/Pc = G'(\theta_s)G(\theta_s) \times G(\theta)_o/G'(\theta)_o$    (Eq. 3.)

This improvement ratio is greater than unity whenever the clutter reduction ratio at zero degree is lower than the signal-level improvement ratio at the target angle. The signal-to-clutter improvement ratio will reach a peak at approximately the peak of the high beam gain.

A desirable position of the high vertical beam is at that elevation angle which provides a null of the free space pattern at exactly zero degree. Positioning the null on the ground will provide an increase in the improvement of the signal-to-clutter ratio. The amount of clutter reduction depends on what proportion of the clutter enters at zero degree and how well the null remains fixed as a function of azimuth. Positioning the null on the ground will increase the detection of close range targets in clutter, but will lower the detectability of close range targets at very low angles because of the reduced gain near zero degree. The antenna gain, however, increases rapidly with elevation angle. Only a small fraction of the targets will suffer any significant detection loss, because at 50 nautical miles an aircraft as low as 10,000 feet is still at an elevation angle as high as 1.6°. The recommended high-beam position of 6.0° is reasonably close to the calculated position required to produce a null at 0° thus coverage diagrams worked out for that position are still representative.

The signal-to-clutter improvement ratio *Psc* (equation 3) was calculated with the following conditions:

a. clutter return is primarily due to the main lobe (side lobe contributions were assumed to be negligible), b. angle of clutter entry is zero degree, and c. since ground lobing affects only very low angle operation, free space patterns are employed.

Figure 4:
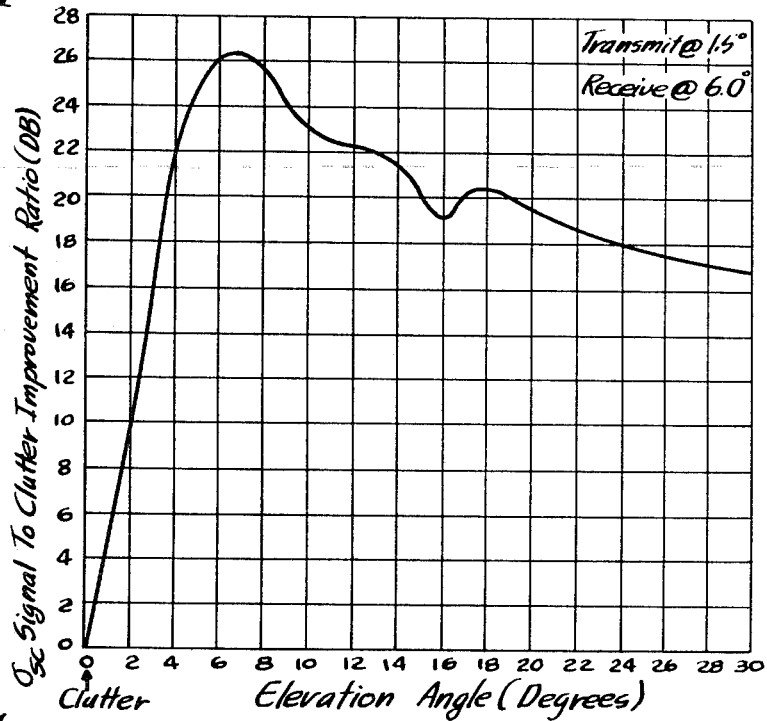
FIG. 4 is a graphical representation of signal-to-clutter improvement ratio versus elevation angle.
Figure 5:
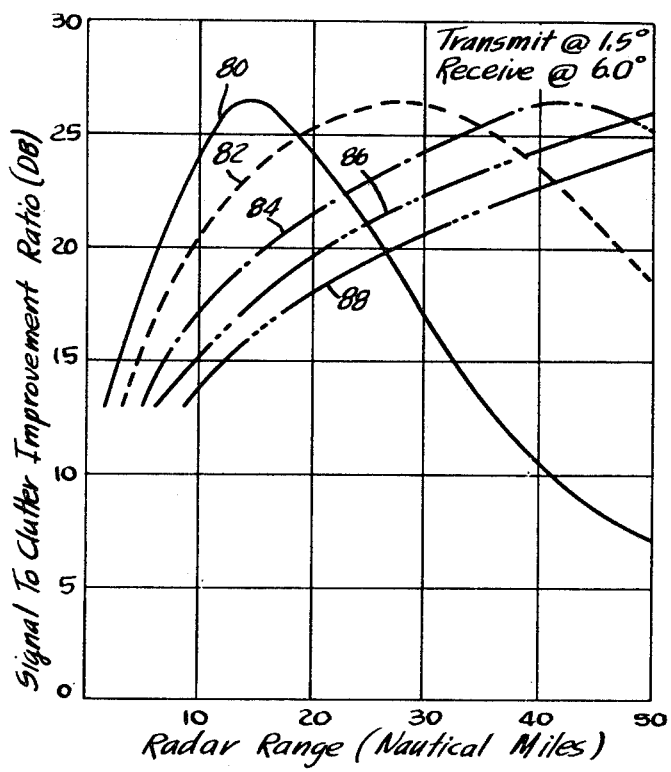
FIG. 5 is a graphical representation of signal-to-clutter improvement ratio versus range for 10,000 to 50,000 foot altitude.
Figure 6:
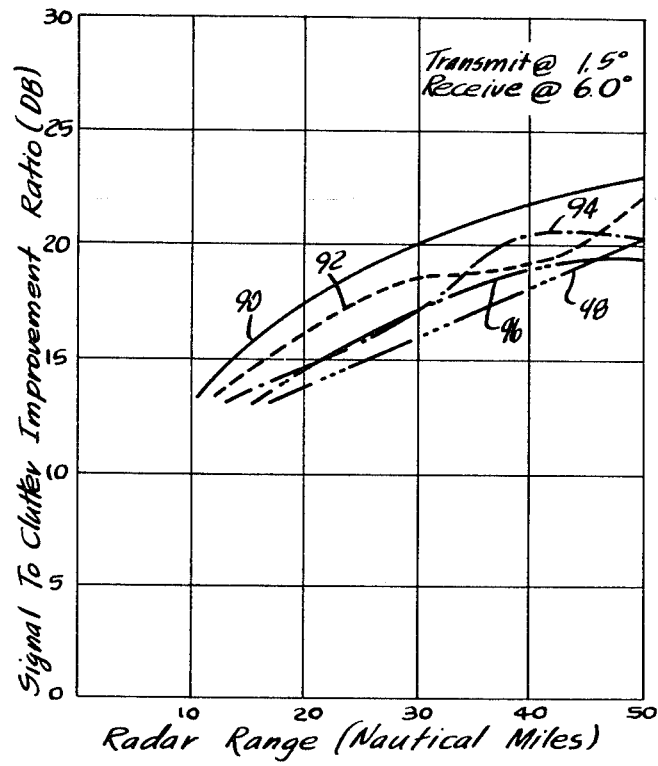
FIG. 6 is a graphical representation of signal-to-clutter improvement ratio versus range for 60,000 to 100,000 foot altitude.

The signal-to-clutter improvement ratio was obtained by dividing the signal-level improvement ratio by the clutter-reduction ratio. The signal return in the high beam is proportional to the product of the gain of the low beam and the gain of the high beam at the target angle. The signal return in the low beam is proportional to the square of the low-beam gain at the target angle. The signal-level improvement ratio is therefore the ratio of the high-beam gain to the low-beam gain. The clutter-reduction ratio is, similarly, the ratio of the high-beam gain to low-beam gain at the clutter angle which was assumed to be zero degree. The signal-to-clutter improvement ratio *Psc* was calculated as the ratio of the signal-return ratio to the clutter-return ratio. Thus, by the use of the high beam, the signal-to-clutter ratio is increased by the ratio *Psc*. The signal-to-clutter improvement ratio for the low and high (1.5 and 6.0°, respectively) vertical beams is plotted as a function of elevation angle in FIG. 4. A peak of 26 db. occurs at 6° and decreases gradually at higher angles to 18 db. at 30°. Below 4°, the signal-to-clutter gain obtained by using the new technique reduces from 22 db. at 4° to zero at the clutter elevation angle of 0°. The data shown in FIG. 4 was converted to operational parameters in which the signal-to-clutter gain was calculated for incremental altitudes at all ranges out to 50 miles. The results for altitudes between 10 and 100,000 feet, at increments of 10,000 feet, are shown in FIGS. 5 and 6. In FIG. 5, 80 designates the 10,000 foot curve, 82 the 20,000 foot curve, 84 the 30,000 foot curve, 86 the 40,000 foot curve, and 88 the 50,000 foot curve. In FIG. 6, 90, 92, 94, 96, and 98 designate the 60,000 foot, 70,000 foot, 80,000 foot, 90,000 foot, and 100,000 foot curves, respectively. These curves show that an appreciable improvement is obtained for all ranges and heights shown. Except for the 10,000 foot altitude curve 80 in FIG. 5 and for extreme close-in ranges, the signal-to-clutter gain does not go below 14 db. For 10,000 feet, the curve 80 dips down to a minimum signal-to-clutter improvement ratio of 7.5 db. At higher altitudes, from 60,000 to 100,000 feet (FIG. 6), the signal-to-clutter gain varies from 14 db. at about 10 miles to 20 db. at 50 miles.

Figure 7:
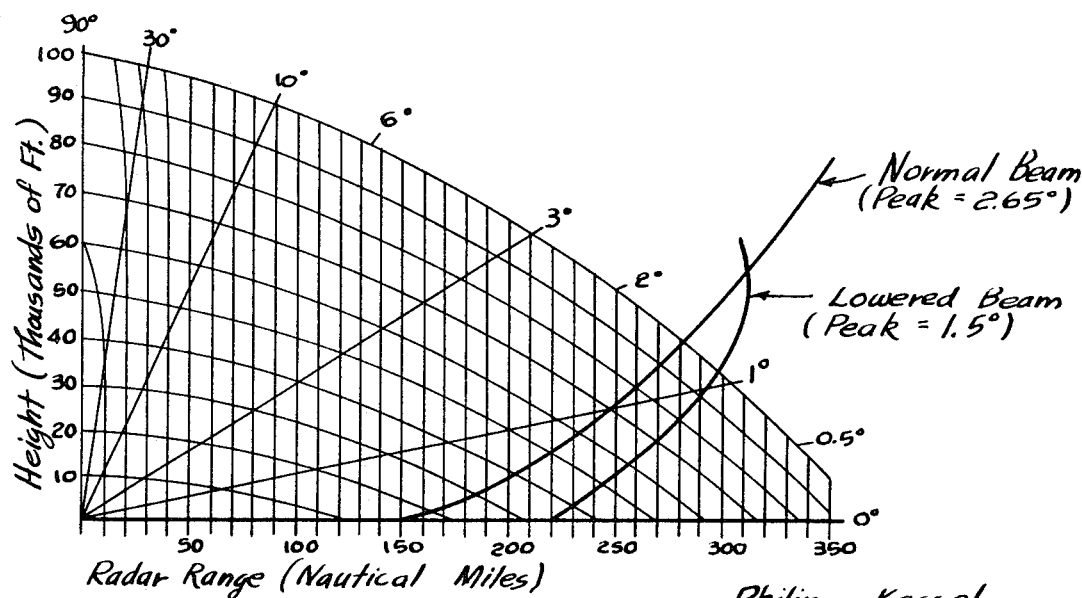
FIG. 7 is a free space coverage diagram.
Figure 8:
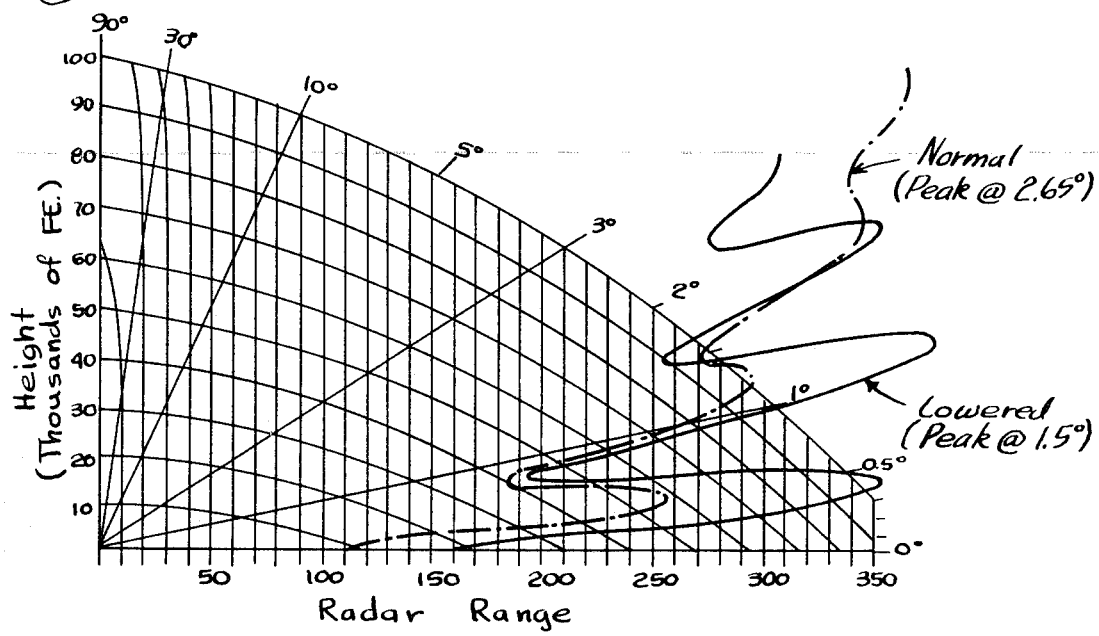
FIG. 8 is a coverage diagram for normal and low beams, 0.50 reflection coefficient.

Lowering the vertical beams from the normal 2.65° heretofore employed in the radar results in an increase in target detectability at low elevation angles. Free-space coverage diagrams showing the low-angle coverage with the normal and lowered beams are shown in FIG. 7. The range at ground level is increased from 150 to 220 miles and at 1° from 250 to 280 miles. The free-space patterns will be modified by lobing due to ground clutter but the above graphs apply for terrain with a low coefficient of reflection. For a typical ground reflection coefficient of 0.5, the low angle coverage patterns were calculated and are shown in FIG. 8. At 0° elevation the range is increased from 110 to 155 miles with the lowered beam and the range on the first peak at 0.4° is increased from 255 to 350 miles. The range at the first null is only increased by about 10 miles but the second peak is increased from 290 to over 350 miles.

The improved coverage of the lowered beam is apparent. The pulse repetition frequency of the radar, however, limits the maximum range to 250 nautical miles; therefore, the improved coverage beyond 250 nautical miles in the lobe-peak area is not directly translated into a range improvement. The increased range at these elevations does, however, allow a greater system degradation without serious range loss, improves performance in an electronic counter measure environment and provides signals with greater signal-to-noise ratios for height computation.

Although the preferred embodiment described with reference to FIG. 1 employs beam switching in the microwave portion of the system, switching could be accomplished in either the intermediate frequency portion or the video portion of a radar system employing the high and low beam concept of the invention. The advantages of switching at the microwave frequency are:

a. noise level stability, receiver noise for both the low and the high beam is the same; the major noise contribution, in a normal environment, is due to the front-end parametric amplifier and, since all the receiver circuits for the high and low beams are the same, slow drifts in gain or noise will cause no differential in noise between the low and high beam channels, b. high sensitivity in the high beam channel is obtained, a common parametric amplifier is employed, c. simplicity, only the microwave network is added, and d. no significant switching transients, fast switching time at radio frequency.

Although microwave switching in front of the parametric amplifier has the above advantages, it does add an insertion loss estimated at 0.8 db. which lowers sensitivity. The increase in vertical beam performance resulting from the lowered beam position more than makes up for this loss.

What is claimed is:

1. A radar system comprising:
transmitter means;
amplifier means;
receiver means;
display means;
beam forming antenna means;
first feed means associated with said antenna means for effecting feed of microwave energy to and from said antenna means and so disposed with respect thereto as to serve a low beam pattern having a predetermined elevation;
second feed means associated with said antenna means for receiving energy from said antenna means and so disposed with respect thereto as to serve a high beam pattern having an elevation higher than said low beam pattern by a predetermined angular amount;
conductor means connecting said transmitter means to said first feed means, connecting said first and second feed means to said amplifier means, connecting said amplifier means to said receiver means, and connecting said receiver means to said display means; and said conductor means including switch means for rendering said system operative alternatively on said low and high beam patterns during receiving.

2. A radar system as defined in claim 1, and:
said conductor means comprising duplexer means between said transmitter means and said first feed means, circulator means between said duplexer means and said switch means, and variable attenuator means between said second feed means and said switch means;
said switch means being operative between first and second conditions, in said first condition said switch connecting said circulator means to said amplifier means, and in said second condition said switch connecting said variable attenuator means to said amplifier means.

3. A radar system as defined in claim 2, and further comprising:
range timing means responsive to radar synch signals to provide, as an output, signals corresponding to range, driver means responsive to said output of said range timing means and connected to said switch means to effect actuation thereof from said first condition to said second condition at a predetermined range.

4. A radar system as defined in claim 3, and further comprising:
second driver means responsive to said output of said range timing means and connected to said variable attenuator means so as to cause said variable attenuator means to attenuate signals received via said second feed means as a function of range.

5. A radar system as defined in claim 4, and wherein:
said circulator means comprises a second output connection;
attenuator means connected to said output connection for dissipating energy received via said first feed means during the time when said switch means is in said second condition.

6. A radar system as defined in claim 5, and wherein:
said first and second feed means comprise first and second dipole means, the configuration of said dipole means and said antenna means providing vertically oriented, fan-shaped beam patterns.

7. A radar system as defined in claim 5, and wherein:
said first and second feed means comprise first and second horn means, the configuration of said horn means and said antenna means providing vertically oriented fan-shaped beam patterns.